(12) United States Patent
Petithomme

(10) Patent No.: US 8,176,449 B1
(45) Date of Patent: May 8, 2012

(54) INFERENCE OF HARDWARE COMPONENTS FROM LOGIC PATTERNS

(75) Inventor: Stephane C. Petithomme, St. Georie en Valdaine (FR)

(73) Assignee: Xilinx, Inc., San Jose, CA (US)

( * ) Notice: Subject to any disclaimer, the term of this patent is extended or adjusted under 35 U.S.C. 154(b) by 154 days.

(21) Appl. No.: 12/722,139

(22) Filed: Mar. 11, 2010

(51) Int. Cl.
*G06F 17/50* (2006.01)

(52) U.S. Cl. ......... 716/103; 716/104; 716/116; 716/136

(58) Field of Classification Search .................. None
See application file for complete search history.

(56) References Cited

U.S. PATENT DOCUMENTS

| | | | |
|---|---|---|---|
| 5,835,393 A | 11/1998 | Melanson et al. | |
| 6,871,328 B1 * | 3/2005 | Fung et al. | 716/116 |
| 7,757,187 B2 * | 7/2010 | Kheterpal et al. | 716/105 |
| 7,784,013 B2 * | 8/2010 | Motiani et al. | 716/103 |
| 2007/0198971 A1 * | 8/2007 | Dasu et al. | 717/140 |
| 2008/0163151 A1 * | 7/2008 | Motiani et al. | 716/17 |
| 2010/0318947 A1 * | 12/2010 | Motiani et al. | 716/104 |

OTHER PUBLICATIONS

B. Fawcett, Development Tools Ease Programmable Logic Design Portability, IEEE Colloquium on Software Support and CAD Techniques for FPGAs, pp. 2/1-2/3, Apr. 1994.*
Y. Hu et al., Design and Synthesis of Programmable Logic BLock with Mixed LUT and Macrogate, IEEE Transactions on Computer-Aided Design of Integrated Circuits and Systems, pp. 591-595, Mar. 2009.*
R. Alessi et al., Integrating Logic Synthesis Into a Full Chip Asic Design System, Second Annual IEEE ASIC Seminar and Exhibit, pp. 2-2/1-4, Sep. 1989.*
V. Kheterpal et al., Design Methodology for IC Manufacturability based on Regular Logic Bricks, Proceedings of the 42nd ACM/IEEE Design Automation Conference, pp. 353-358, Oct. 2007.*
Xilinx, Inc., *Xst User Guide for Virtex-6 and Spartan-6 Devices*, User Guide UG687 (v 11.4), Dec. 2, 2009. pp. 155-172 (19 pages total), Xilinx, Inc., San Jose, California, USA.
Xilinx, Inc., *Virtex-5 FPGA XtremeDSP Design Considerations*, User Guide UG193 (v 3.3), Jan. 12, 2009, pp. 63-115 (54 pages total), Xilinx, Inc., San Jose, California, USA.
Xilinx, Inc., *CTL Register Absorption on DSP*, Project Note, Aug. 28, 2006, pp. 1-3, Xilinx, Inc., San Jose, California, USA.
Xilinx, Inc., *Sandia MAC, MultAdds and Accumulators*, Project Note, Aug. 29, 2006, pp. 1-2, Xilinx, Inc., San Jose, California, USA.
Xilinx, Inc., *DSP .20 Cascading Adders*, Project Note, printed Dec. 3, 2009 from http://xgrweb/projman/pfs/DSP/DSP.20.html, pp. 1-3, Xilinx, Inc., San Jose, California, USA.
Xilinx, Inc., *Register Absorption on DSP OPMODE*, Project Note, Aug. 29, 2006, pp. 1-2, Xilinx, Inc., San Jose, California, USA.

* cited by examiner

*Primary Examiner* — Leigh Garbowski
*Assistant Examiner* — A. M. Thompson
(74) *Attorney, Agent, or Firm* — LeRoy D. Maunu; Lois D. Cartier

(57) ABSTRACT

The present invention provides a simplified process for inference using a generic logic pattern corresponding to one or more generic functions provided by the hardware component. A circuit design is mapped into a plurality of interconnected hardware components, and a subset of the hardware components that matches a logic pattern are identified. Components of the subset are replaced with an inferred hardware component associated with the logic pattern. After matching the pattern, additional components connected to the inferred hardware component are iteratively analyzed to determine whether those additional connected components can be implemented using additional logic of the inferred hardware component.

18 Claims, 6 Drawing Sheets

INFERENCE OF HARDWARE COMPONENTS FROM LOGIC PATTERNS

FIELD OF THE INVENTION

The present invention generally relates to the inference of circuit design components from behavioral models.

BACKGROUND

Due to advancements in processing technology, complex integrated circuits (ICs) can be designed using various levels of abstraction. Using a hardware description language (HDL), circuits can be designed at the gate level, the register transfer level (RTL), and higher logical levels. When designing using an HDL, the designer describes a module in terms of signals that are generated and propagated through combinatorial modules, from one set of registers to another set of registers. HDLs provide a rich set of constructs to describe the functionality of a module. Modules may be combined and augmented to form even higher-level modules.

When ICs are designed at a higher level, lower level representations are needed before a design can be fabricated or implemented on hardware. For example, if a design is to be implemented on a programmable logic device (PLD), the process to translate the design into an executable form includes synthesis, mapping, placement, routing, and bitstream generation.

An HDL design is synthesized to create a logical network list (netlist), which can be implemented within a particular programmable logic device. Before an HDL design can be synthesized into a netlist, the design must go through the preparatory processes of analysis and elaboration. In the analysis process, the HDL design is examined to determine if it contains syntax or semantic errors. If no errors are discovered, the analyzer creates an intermediate representation of each design module and stores the intermediate representations in a library.

In the elaboration process, the design is reduced to a collection of signals and processes. Each logic component is constructed and connections between logic components are established. This is generally done by parsing the design. For each instance of a design module encountered during parsing, a data structure is created for the instance and placed into a parse tree. The data structure implementing an instance contains the processes of the module, variables used by those processes, and variables representing input and output signals from the module instance. Memory is allocated to store the processes and signal variables and initial values that are assigned to the signal variables. The location or offset of the allocated memory is stored within the data structures.

Following elaboration, executable simulation code is synthesized from the process data files, which are stored in a process library, using the memory addresses and initial values allocated and assigned to the module instances. For each process, a hardware component is selected to implement the process in hardware. Hardware components are selected for each process by either instantiation or inference.

Instantiation and inference are two different methods of adding components to an implemented design. When a component is instantiated, a specific hardware component is identified by a designer to be included in the implementation of the realized design. Instantiation gives a designer full control over how the component is used; therefore, a designer knows exactly how the logic components will be implemented. However, instantiation is not flexible. Generally, in an HDL file, specific syntax must be used to instantiate a component. Therefore, HDL code written to instantiate a component available on a particular field programmable gate array (FPGA) may not be portable to another FPGA if the FPGA does not implement the particular combination of instantiated components.

When a component is inferred, a designer provides a behavioral description of the function to be performed, such as an HDL description. The synthesis tool then interprets the HDL code to determine which hardware components to use to perform the function. Inference offers readable and portable code that can be used to target different architectures. It is often preferable to behaviorally describe the design and let the synthesis tool do the mapping of the code into the gates available in a target programmable logic device. In addition to making the code more portable, all inferred logic is visible to the synthesis tool, allowing the tool to perform optimizations between functions. These optimizations can include logic replications, restructuring and merging, or retiming to balance logic delay between registers.

When device library cells are instantiated, synthesis tools do not optimize them by default. Even when instructed to optimize the device library cells, synthesis tools generally cannot perform the same level of optimization that can be performed at the RTL. Therefore, synthesis tools typically only perform optimizations on the paths to and from these cells, but not through the cells.

There are, however, cases where instantiation is desirable. This is typically when the synthesis tool mapping does not meet the timing, power, or area constraints, or if a particular feature within an FPGA cannot be inferred. With instantiation, the designer has total control over the synthesis tool. For instance, to achieve better performance, the designer can implement a comparator using only lookup tables (LUTs), instead of the combination of LUTs and carry chain elements usually chosen by the synthesis tool. In other instances, instantiation is the only way to make use of the complex resources available in the device. For example, when an Intellectual Property (IP) core is included as part of the design, the source code is not available to allow inference. When an IP core is used, the component must be instantiated using a HDL black box module provided by the IP core vender.

Current methods of inference are performed at the logical level during synthesis. This is done by creating an exhaustive description file of the various patterns for each configuration or combination of logic that may be implemented within each component. When a component has many configurable features, such as the various configurations provided by a multiply-accumulator, the number of patterns needed for inference can become large. As new features are added to the component, new sets of inference patterns must also be created. Additionally, because inference is performed at the logical level, it is impossible to consider and implement timing optimizations The present invention may address one or more of the above issues.

SUMMARY

In one of the various contemplated embodiments of the invention, a processor-implemented method is provided for the synthesis of a hardware description language (HDL) design. The design is mapped into a plurality of interconnected hardware components and a subset of the hardware components that matches a logic pattern are identified. Components of the subset are replaced with an inferred hardware component associated with the logic pattern. For each additional hardware component connected to a hardware component in the first subset, it is determined whether the additional hardware component can be implemented within the inferred hardware component. In response to determining the additional hardware component can be implemented in the inferred hardware component, the mapped design is transformed by a processor to implement the additional component within the inferred hardware component.

In another embodiment of the invention, an article of manufacture is provided. The article is characterized by a processor-readable storage medium storing processor-executable instructions causing one or more processors to process a circuit design. When the instructions are executed by a processor, the instructions cause the processor to map a design into a plurality of interconnected hardware components and identify a subset of the hardware components that match a logic pattern. The instructions further cause the processor to replace the first subset with an inferred hardware component associated with the logic pattern. For each additional hardware component connected to a hardware component in the first subset, the instructions cause the processor to determine whether the additional hardware component can be implemented within the inferred hardware component and transform the mapped design to implement the additional component within the inferred hardware component in response to determining the additional hardware component can be implemented in the inferred hardware component.

In yet another of the various embodiments of the invention, a system is provided for performing inference of an HDL design. The system includes: a processor; a bus coupled to the processor; a memory unit coupled to the bus; and a storage unit coupled to the bus. The processor and the memory unit are configured to map the HDL design into a plurality of interconnected hardware components and identify a subset of the hardware components that matches a logic pattern. The processor and memory further replace the first subset with an inferred hardware component associated with the logic pattern. For each additional hardware component connected to a hardware component in the first subset, the processor and memory determine whether the additional hardware component can be implemented within the inferred hardware component and, in response to determining the additional hardware component can be implemented in the inferred hardware component, transform the mapped design to implement the additional component within the inferred hardware component.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIGS. 4-1 illustrates a block diagram of a mapped design in which a subset of components has been identified as matching the logic pattern and has been implemented within the inferred hardware component;

FIGS. 4-2 illustrates a block diagram of a mapped design after inference performed in FIGS. 4-1 in which additional components are implemented within the inferred component;

FIGS. 4-3 illustrates a block diagram of a mapped design after inference performed in FIGS. 4-1 and 4-2 in which an additional component is implemented within the inferred component;

DETAILED DESCRIPTION

The embodiments of the present invention provide approaches for inference of hardware components, those approaches being based on a generic logic pattern applied during synthesis and followed by iterative inference of surrounding logic.

The generic logic pattern corresponds to one or more functions provided by a hardware component on the target device used to implement inferred portions of the design. Hardware of the target device used to implement an inferred portion of the design is referred to as the replacement component. The replacement component is also referred to as the inferred hardware component, and such terms are used interchangeably herein. After matching the pattern, additional components of the design connected to the replacement component are iteratively analyzed to determine whether those connected components can be implemented using additional logic of the replacement component. Iterative analysis may be performed after synthesis or place-and-route. Because the iterative inference can take place after place-and-route, timing can be analyzed to determine whether an identified additional component should be implemented within the replacement component. By performing inference in iterative steps, logic analysis and the maintenance of patterns are simplified.

Figure 1:
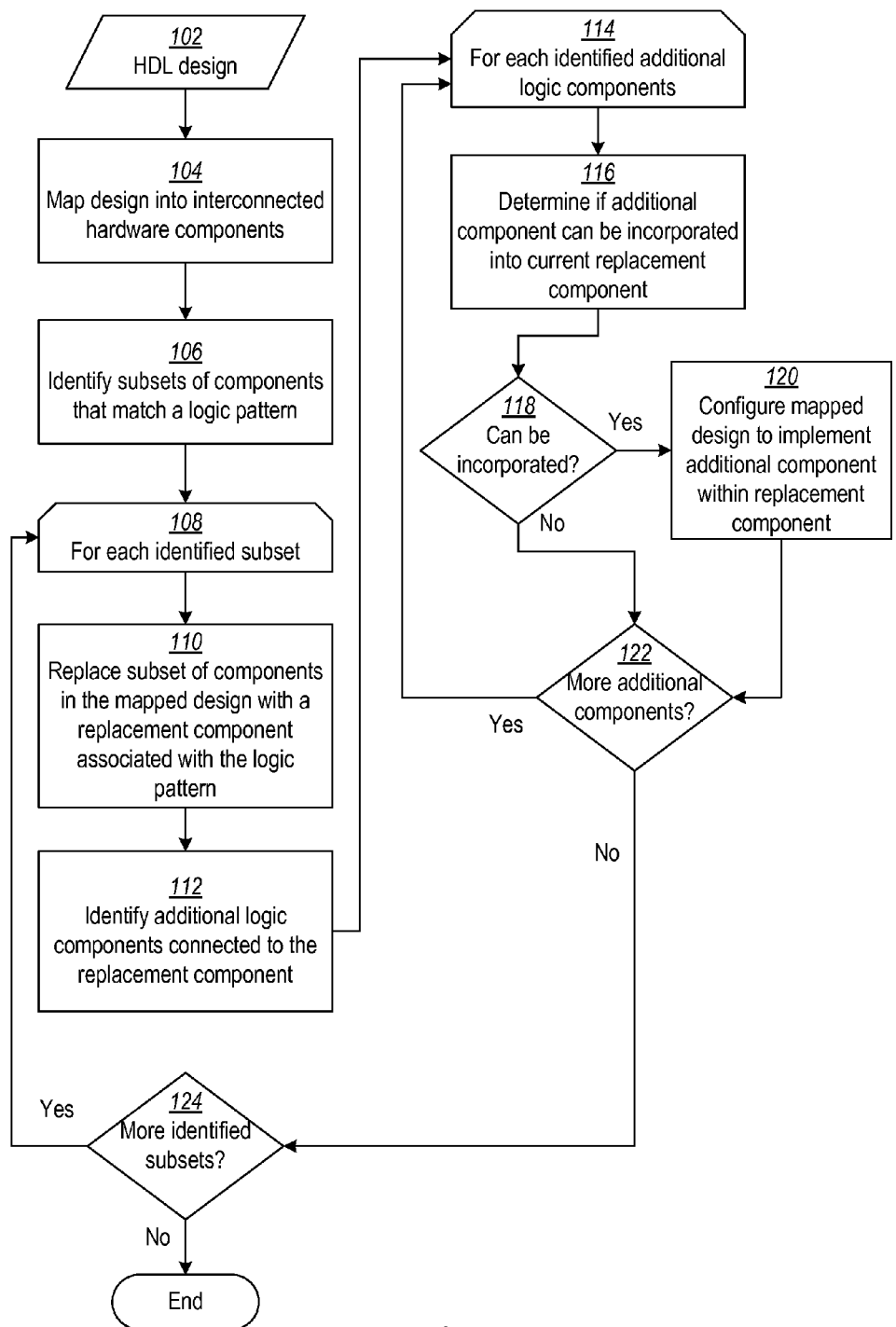
FIG. 1 illustrates a flowchart of a process for performing inference in accordance with several embodiments of the present invention.

FIG. 1 illustrates a flowchart of a process for performing inference in accordance with several embodiments of the present invention. An HDL specification 102 is mapped into a set of interconnected hardware components at step 104. The set of mapped components is created during synthesis of a design. Subsets of components in the interconnected set that match a logic pattern, which is representative of a digital signal processing component available on a target device, for example, are identified at step 106. For each identified subset 108, the subset of components is replaced with a replacement component associated with the logic pattern at step 110.

The replacement component may contain additional advanced hardware to perform functions in addition to hardware provided to implement the logic pattern. The additional advanced hardware may implement functions such as: register storage, pre-adder swap operations, loopback, inverter simplification, constant input simplification, shift operations, cascaded or daisy chained inputs and outputs between multiple instances of the hardware component, power optimization, etc. After an identified subset is replaced with the appropriate replacement component, the additional hardware would be available for inference of other components formerly connected to the replaced subset. Additional components connected to the replacement component are identified at step 112. For each identified additional component 114, the process determines whether the additional component can be implemented within the replacement component using the additional hardware at steps 116 and 118. If it is determined that the additional component can be incorporated, the mapped design is configured to implement the additional component within the replacement component at step 120. The process is repeated, as controlled by decision step 122, with each iteration identifying new additional components connected to the reconfigured replacement component and the process terminating once all additional components have been analyzed.

It is understood that the invention is equally applicable to the inference of additional components on additional hardware available within hardware components that have been instantiated as well. In various embodiments of the invention, iterative inference of additional components is performed on any additional components that are connected to any components that have been either inferred or instantiated. By performing iterative inference, a replacement component available on a target device may implement any number of configurations of the replacement component without the use of multiple logic patterns for all possible configurations.

In various embodiments of the invention, timing analysis is performed before implementing a component within an inferred replacement component. For each component or set of components to be extracted and implemented within a replacement component, timing information is determined for the original configuration and for the proposed configuration having the component(s) implemented within the replacement component. If timing is improved in the proposed configuration, the current configuration is modified to implement the components within the inferred replacement component.

In addition to timing analysis, various embodiments of the invention analyze logical paths to identify subsets of components connected to an inferred replacement component, or implemented within an inferred replacement component, that produce constant output. The mapped design is configured to implement the identified subset generating a constant value within a constant value generator of the replacement component. Identification of a subset of components generating a constant value can also be iteratively identified. In various embodiments of the present invention, a second logic pattern is used to identify the subset of components generating a constant value. Constants are identified by looking for Ground or common collector voltage (Vcc) on the input pin of a component.

Once a subset is determined to output a constant value, additional components coupled to receive the constant value as input are analyzed to determine if they produce a constant value as well. Once all additional components connected to the constant output have been analyzed, the mapped design is configured to implement the identified set generating a constant value within the constant value generator. For example, an inferred replacement component may be configured to implement the logic ((1+A)*B). If logic analysis determines input A to be a constant value equal to 0x1f, the output of the pre-adder implementing (1+A) would then be identified as outputting a constant value of (1+A)=0x20.

Once the bounds of a constant value generating subset are identified, further optimization may be performed on components that receive the constant value as input. In this example, the multiplication operation (0x20*B) is identified as a shift operation. The mapped design is configured to implement the multiplication operation within a shift register within the inferred replacement component.

Figure 2:
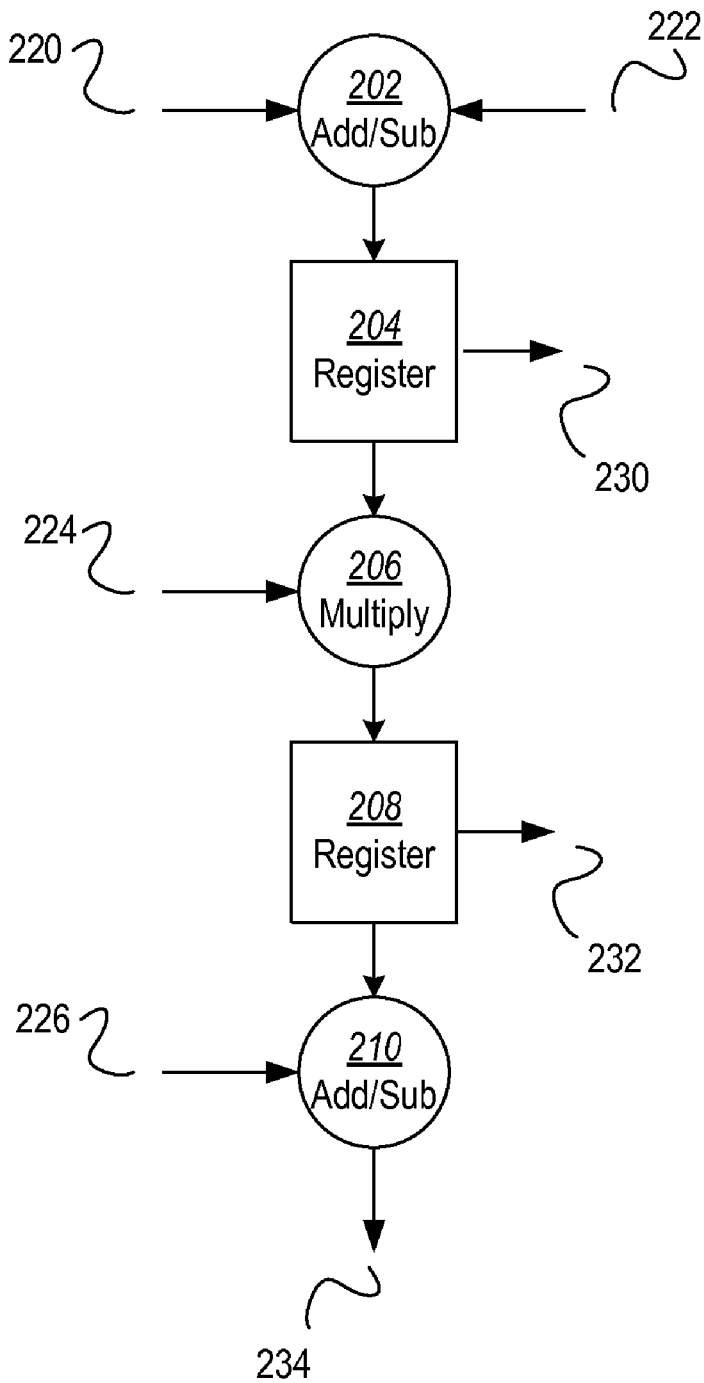
FIG. 2 illustrates a block diagram of a pre-added multiply adder which can be used as a logic pattern for inference in accordance with several embodiments of the invention.

FIG. 2 illustrates a block diagram of a pre-added multiply adder which is an example of a logic pattern that can be used for inference in accordance with several embodiments of the invention. The pre-adder multiply adder includes a multiplier 206 having one input coupled to a pre-adder 202 and an output coupled to a post-adder 210. The multiplier, pre-adder, and post-adder have respective external inputs, 224, 220 and 222, and 226. Generally, as shown, the pre and post adders are separated from the multiplier 206 by registers 204 and 208. Output of the multiplier, and post adder are available from respective outputs 232, and 234. A pre-adder multiply adder is chosen as an example logic pattern because the input and outputs can be routed to perform numerous advanced functionalities. For example, output 234 can be connected to input 226 to implement a multiply accumulator.

It is understood that various different logic configurations may be used for the pattern depending on the functionality of the corresponding digital signal processor component to be used to implement inferred components of the design. For example, the pre and post-adder blocks of a pre-adder multiply adder component may be an adder, a subtractor, or an addition+subtraction block with a dynamic operand. Further, the pre and post processing blocks 202 and 210 of the corresponding digital signal processor component may be implemented by an arithmetic logic unit (ALU), in which case the pattern may match any logic capable of being performed by the ALU such as: add, subtract, AND, OR, NOR, XOR, etc. For example, if the post-adder is implemented by an ALU with XOR functionality, a portion of the circuit design with an XOR followed by a multiply and an add operation would match the pre-added multiply adder pattern.

It is also understood that different logic configuration patterns may be used for the same target component depending on user settings for inference. In some embodiments of the invention, a logic pattern may include one or more optional component elements. Using the pre-adder multiply adder as an example, the logic pattern may be implemented such that the multiplier 224 and/or the pre and post adder blocks 202 and 210 may not be required to match the logic pattern in some implementations of the invention. By making the multiplier and/or the pre- and post blocks optional, a multiply accumulator (MAC), which contains an adder followed by multiplier, will match the logic pattern during inference and would be implemented within a pre-adder multiply adder. Likewise, if the multiplier is made optional, a simple accumulator would match the logic pattern and would be implemented by a pre-added multiply adder. Additionally, several different special purpose hardware components may be available on a target device. In which case, it is understood that different logic patterns may be used during inference for each hardware component available.

Figure 3:
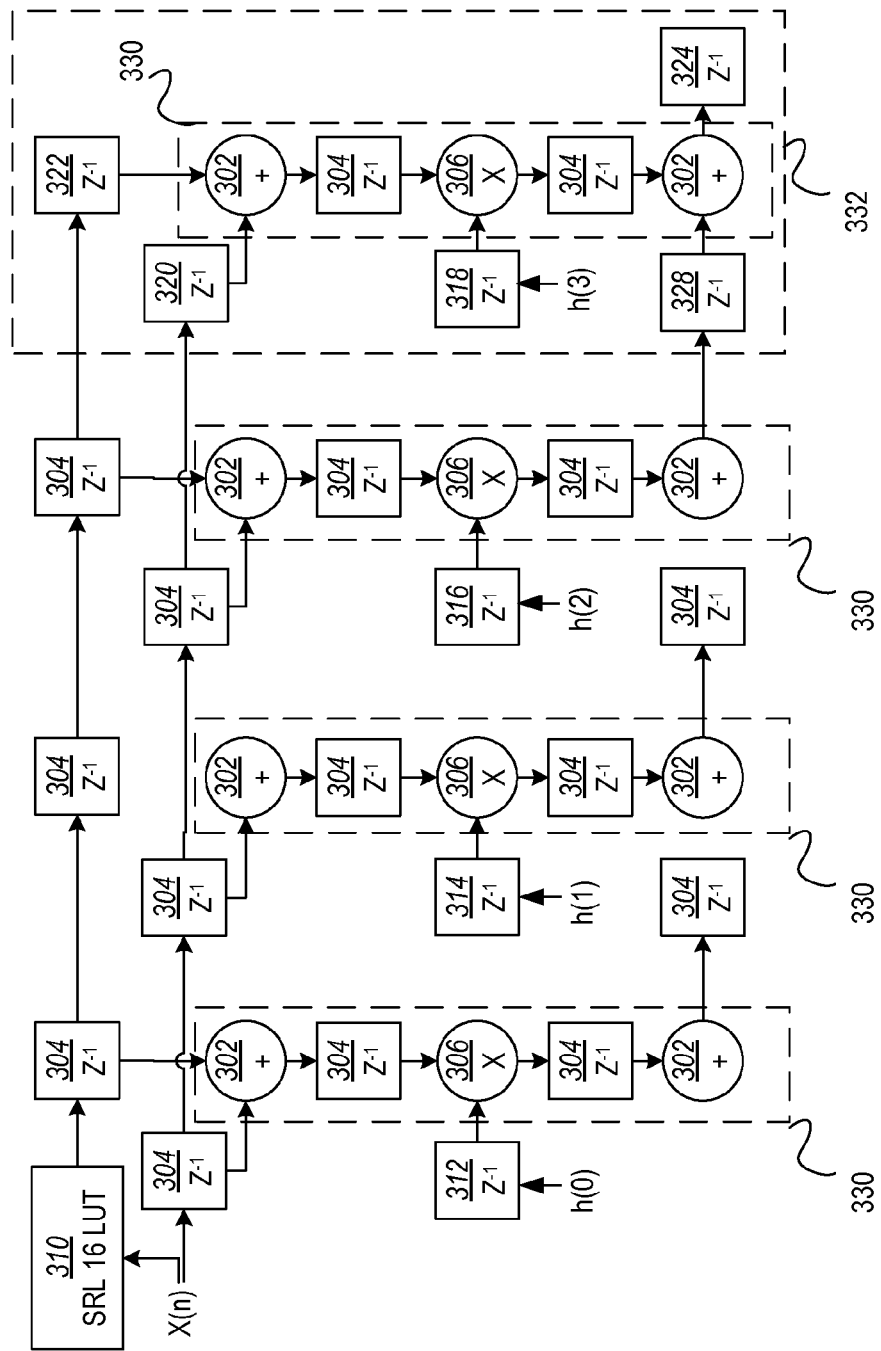
FIG. 3 illustrates a block diagram of a mapped design of a systolic 8-tap FIR during the process of inference.

FIG. 3 illustrates a block diagram of a mapped design of a systolic 8-tap FIR filter from which implementing hardware components may be inferred. The FIR filter includes registers 304, 314, 316, 318; adders 302; multipliers 306; and shift register 310. Dashed blocks 330 shows groups of components that have been identified as matching the logic pattern of the pre-adder multiply adder shown in FIG. 2. Components within dashed blocks 330 will be replaced with corresponding replacement hardware in the first iteration. Dashed block 332 illustrates connected components that may be implemented within a replacement component after further inference. In this example, further inference has identified registers 318, 320, 322, 324, and 328 as additional components connected to the matching identified set of components. The identified registers have been determined to be implementable by the replacement component and have been extracted from the surrounding design for implementation within the inferred replacement component. Further inference may identify additional components connected to components in the 332 block or other 330 blocks.

In addition to iteratively analyzing additional components connected to an inferred replacement component for incorporation in whole, the additional components can be decomposed into smaller logical pieces to extract logic that may be incorporated into the inferred replacement component. FIGS.

4-1, 4-2, and 4-3 illustrate a block diagram of a behavioral circuit design during the steps of inference in which logic is extracted from one of the additional components.

Figures 3, 4:
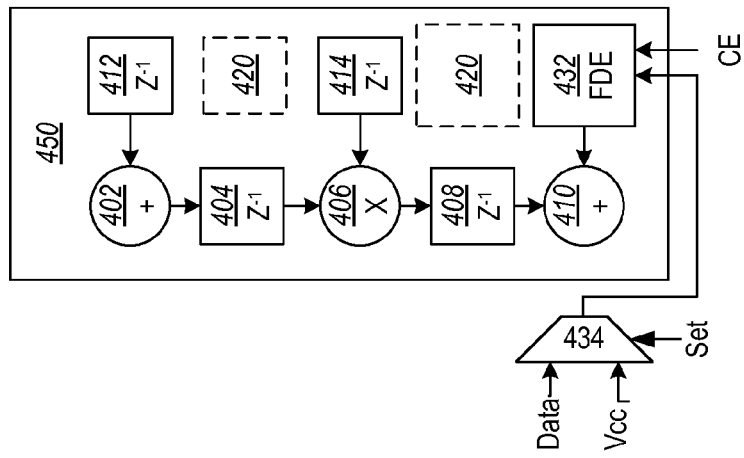
Figures 2, 4:
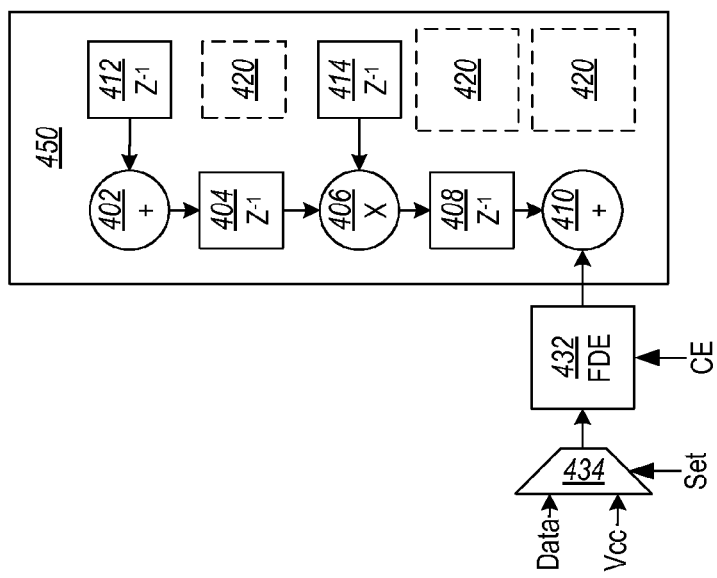
Figures 1, 4:
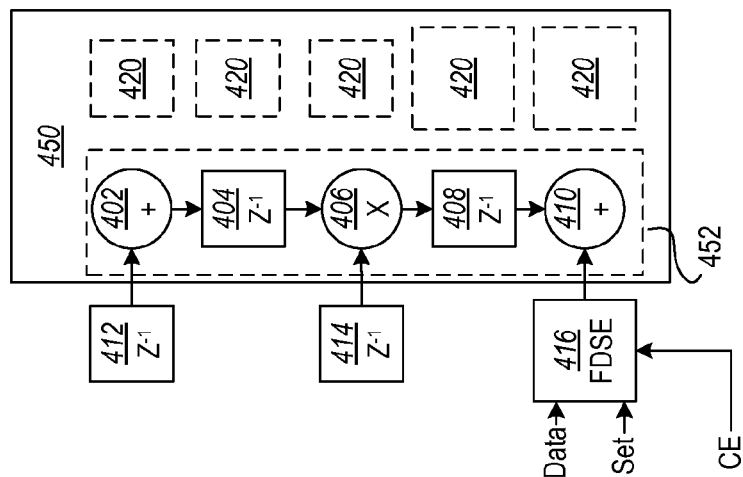

FIGS. 4-1 shows the design of a pre-added multiply adder with register 412 connected to the input of pre-adder 402, register 414 connected to multiply 406, and D Flip-Flop with Clock Enable and Synchronous Set (FDSE) 416 connected to post-adder 410. The group of components 452 identified as matching the pre-added multiply adder logic pattern has been implemented within inferred replacement component 450. In addition to hardware to implement the group of components matching the logic pattern, inferred replacement component 450 contains additional logic component hardware 420 that is yet to be utilized. The circuit is optimized by performing further analysis to infer surrounding logic that may be implemented with the additional unutilized hardware.

FIGS. 4-2 shows the design of FIGS. 4-1 after further inference. Registers 412 and 414 have been implemented within the inferred replacement component 450 using additional logic component hardware 420. In this example, the inferred replacement component 450 cannot implement FDSE 416 because the inferred replacement component lacks set functionality. FDSE 416 has been identified as containing D Flip Flop with Enable (FDE) 432, which can be implemented in the inferred replacement component. The FDSE 416 has been decomposed to extract the FDE logic that can be implemented within the inferred replacement component. In the transformation, FDSE 416 has been converted to an FDE 432 with synchronized set functionality performed by Multiplexor (MUX) 434.

FIGS. 4-3 shows the design of FIGS. 4-2 after further inference. FDE 432, created from the decomposition of FDSE 416 in FIGS. 4-2, has been implemented within the inferred replacement component 450 using one of the unused additional logic components 420. At this point inference is complete because MUX 434 cannot be implemented within the inferred replacement component 450, which lacks the set functionality.

As another example of logic extraction, a D flip-flop with synchronous reset and set (FDRS) can be transformed, into a D flip-flop with clock enable and synchronous reset (FDRE). In performing the transformation, the set bit of the FDRS can be implemented by the clock-enable bit of the FDRE. In this manner an inferred component with FDRE hardware can implement FDRS logic. It is understood that the transformations are examples only. The logic extraction available depends on and is only limited by the hardware available in the inferred replacement component.

Figure 5:
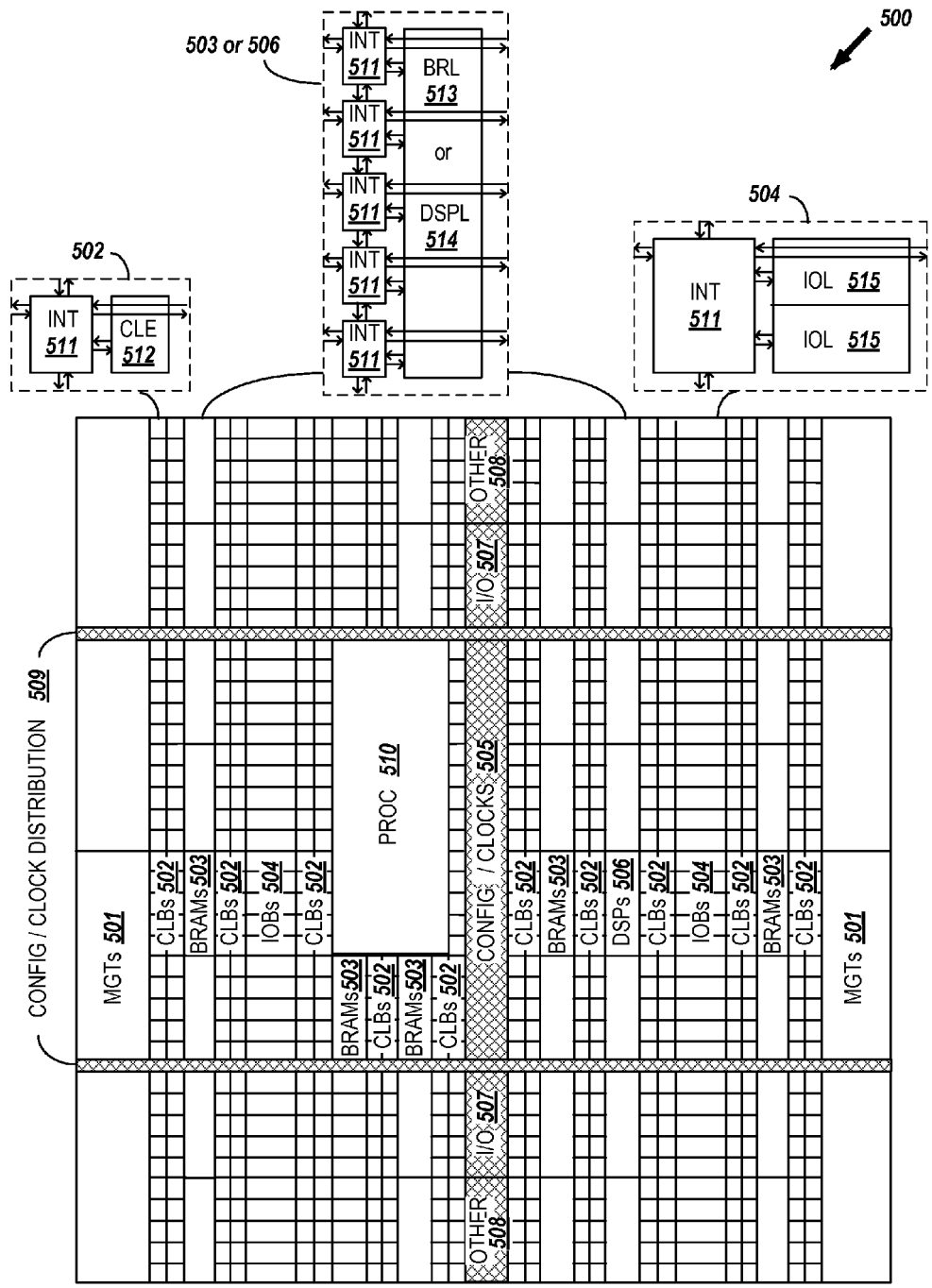
FIG. 5 is a block diagram of an example field programmable gate array (FPGA) which may be used as a target device for inference in accordance with various embodiments of the invention.

FIG. 5 is a block diagram of an example field programmable gate array (FPGA) which may be used as a target device for inference in accordance with various embodiments of the invention. FPGAs can include several different types of programmable logic blocks in the array. For example, FIG. 5 illustrates an FPGA architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507), for example, clock ports, and other programmable logic 508 such as digital clock managers, analog-to-digital converters, system monitoring logic, and so forth. Some FPGAs also include dedicated processor blocks (PROC 510). While not shown, it will be appreciated that FPGA 500 also includes external and internal reconfiguration ports.

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used.

A DSP tile 506 can include a DSP logic element (DSPL 514) in addition to an appropriate number of programmable interconnect elements. With the FPGA as the target device, an inference pattern would be provided for the DSP logic element(s) available on the device. If portions of the design are found to be optimal, after timing analysis, those portions would be implemented by the DSP elements.

An IOB 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Figure 6:
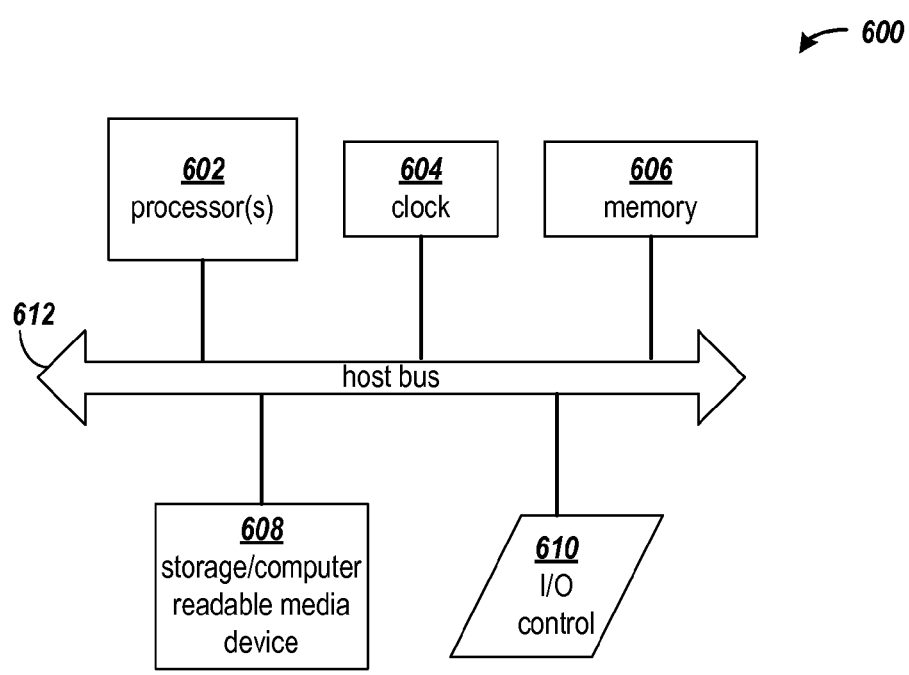
FIG. 6 illustrates a block diagram of a computing arrangement for implementing inference in accordance with several embodiments of the invention.

FIG. 6 illustrates a block diagram of a computing arrangement that may be configured to implement the inference processes described herein. Those skilled in the art will appreciate that various alternative computing arrangements, including one or more processors and a memory arrangement storing program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory unit 606, a storage unit 608, and an input/output control unit 610 coupled to host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory and a main memory. The storage arrangement 608 may include local and/or remote persistent storage such as provided by magnetic disks (not shown), flash, EPROM, or other non-volatile data storage. The storage unit may be read or read/write capable. Further, the memory 606 and storage 608 may be combined in a single arrangement.

The processor arrangement 602 executes the software in storage 608 and/or memory 606 arrangements, reads data from and stores data to the storage 608 and/or memory 606 arrangements, and communicates with external devices through the input/output control arrangement 610. These functions are synchronized by the clock signal generator 604. The resource of the computing arrangement may be managed by either an operating system (not shown), or a hardware control unit (not shown).

The present invention is thought to be applicable to a variety of systems for a data bus controller. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

Those skilled in the art will appreciate that various alternative computing arrangements, including one or more processors and a memory arrangement storing program code, would be suitable for hosting the processes and data structures of the different embodiments of the present invention.

What is claimed is:

1. A processor-implemented method for the synthesis of a hardware description language (HDL) design, comprising:
    mapping a design into a plurality of interconnected hardware components;
    identifying a first subset of the hardware components that match a logic pattern;
    replacing the first subset of the hardware components with a first instance of an inferred hardware component associated with the logic pattern;
    wherein the inferred hardware component contains hardware to implement the logic pattern and additional un-utilized hardware components; and
    for each additional hardware component of the plurality of hardware components that is connected to a hardware component in the first subset:
        determining whether or not the additional un-utilized hardware components are sufficient to implement the additional hardware component within the first instance; and
        in response to determining the additional un-utilized hardware components are sufficient to implement the additional hardware component in the first instance, transforming, by a processor, the mapped design to implement the additional component by the additional un-utilized hardware components within the first instance.

2. The method of claim 1, further comprising:
    in response to determining the additional un-utilized hardware components are sufficient to implement the additional component in the first instance, generating and comparing timing information for the mapped design and for a version of the mapped design altered to implement the additional component within the first instance; and
    wherein the mapped design is transformed to implement the additional component within the first instance in response to the timing information indicating an improvement in the transformed mapped design.

3. The method of claim 1, wherein the identifying the first subset of the hardware components that match a logic pattern includes identifying a pre-added multiply adder.

4. The method of claim 1, further comprising:
    in response to determining the additional un-utilized hardware components are not sufficient to implement the additional component in the first instance, determining whether or not the additional component can be transformed into sub-components with the additional un-utilized hardware components being sufficient to implement at least one of the sub-components within the first instance; and
    in response to determining the additional un-utilized hardware components being sufficient to implement the at least one of the sub-components in the first instance, transforming the mapped design to implement the at least one sub-component by the additional un-utilized hardware components within the first instance.

5. The method of claim 1, wherein the identifying the first subset of the hardware components that match a logic pattern includes identifying the logic pattern in any subset of the hardware components that are instantiated.

6. The method of claim 1, wherein the identifying the first subset of the hardware components that match a logic pattern includes identifying the logic pattern in as having one or more optional components.

7. The method of claim 1, wherein:
    the inferred hardware component provides an implementation for a D flip-flop with clock enable and synchronous reset (FDRE) in addition to an implementation for the identified subset of hardware components, and
    the method further comprises:
        transforming two or more additional components of the plurality of components that include a D flip-flop with synchronous reset and set (FDRS) and are connected to a hardware component in the first subset, into a set of components including an FDRE; and
        transforming the mapped design to implement the FDRS within the first instance.

8. The method of claim 1, wherein:
    the inferred hardware component provides an implementation for a D flip-flop with clock enable (FDE) in addition to an implementation for the identified subset of hardware components, and
    the method further comprises:
        transforming two or more additional components including a D flip-flop with clock enable and synchronous set (FDSE) and connected to a hardware component in the first subset, into a set of components including an FDE; and
        transforming the mapped design to implement the FDE within the first instance.

9. The method of claim 1, further comprising:
    identifying a second subset of the hardware components that match the logic pattern;
    replacing the second subset of hardware components with a second instance of the inferred hardware component;

identifying a register connected to an input of the first instance and an input of the second instance; and transforming the mapped design to implement the identified register within the first instance, with the output of the register implemented in the first instance connected to the input of the second instance.

10. The method of claim 1, wherein the replacing the first subset of the hardware components with a first instance of an inferred hardware component includes replacing the first subset of the hardware components with the first instance of the inferred hardware component that provides an implementation for a register as one of the additional un-utilized hardware components.

11. The method of claim 1, wherein the replacing the first subset of the hardware components with a first instance of an inferred hardware component includes replacing the first subset of the hardware components with the first instance of the inferred hardware component that provides an implementation of an inverter as one of the additional un-utilized hardware components.

12. The method of claim 1, further comprising reconfiguring inputs/outputs of the inferred hardware component for power and timing optimization.

13. The method of claim 1, further comprising:
identifying a second subset of the hardware components that match the logic pattern;
replacing the second subset of hardware components with a second instance of the inferred hardware component; and
transforming the mapped design to implement the second instance within the first instance.

14. The method of claim 1, wherein the identifying, replacing, determining, and transforming are performed after mapping a design into a plurality of interconnected components.

15. The method of claim 1, further comprising:
identifying a second subset of the hardware components that match the logic pattern;
replacing the second subset of hardware components with a second instance of the inferred hardware component;
identifying a register connected to provide input to the first instance and receive output from the second instance; and
transforming the mapped design to implement the identified register within one of the first and second instances.

16. The method of claim 1, wherein:
the inferred hardware component provides an implementation of hardware for generating a constant value, and the method further comprises:
identifying a second subset of the hardware components that produce constant outputs; and
transforming the mapped design to implement the second subset of hardware components in the first instance.

17. An article of manufacture, comprising:
a processor-readable storage medium storing processor-executable instructions causing one or more processors to process a circuit design, the instructions when executed by a processor causing the processor to perform operations including:
mapping a design into a plurality of interconnected hardware components;

identifying a first subset of the hardware components that match a logic pattern;
replacing the first subset with an inferred hardware component associated with the logic pattern;
wherein the inferred hardware component contains hardware to implement the logic pattern and additional un-utilized hardware components; and
for each additional hardware component of the plurality of hardware components that is connected to a hardware component in the first subset:
determining whether or not the additional un-utilized hardware components are sufficient to implement the additional hardware component within the inferred hardware component; and
in response to determining the additional un-utilized hardware components are sufficient to implement the additional hardware component in the inferred hardware component, transforming the mapped design to implement the additional component by the additional un-utilized hardware components within the inferred hardware component.

18. A system for performing inference of a hardware description language (HDL) design, the system comprising: a processor;
a bus coupled to the processor;
a memory unit coupled to the bus; and
a storage unit coupled to the bus;
wherein the processor and the memory unit are configured to execute instructions performing:
mapping the HDL design into a plurality of interconnected hardware components;
identifying a first subset of the hardware components that match a logic pattern;
replacing the first subset with an inferred hardware component associated with the logic pattern;
wherein the inferred hardware component contains hardware to implement the logic pattern and additional un-utilized hardware components;
and for each additional hardware component of the plurality of hardware components that is connected to a hardware component in the first subset:
determining whether or not the additional un-utilized hardware components are sufficient to implement the additional hardware component can be implemented within the inferred hardware component; and
in response to determining the additional un-utilized hardware components are sufficient to implement the additional hardware component can be implemented in the inferred hardware component, transforming the mapped design to implement the additional component by the additional un-utilized hardware components within the inferred hardware component.

* * * * *